US008665932B2

(12) United States Patent
Cendrillon et al.

(10) Patent No.: US 8,665,932 B2
(45) Date of Patent: Mar. 4, 2014

(54) LOW COMPLEXITY TECHNIQUE FOR DIGITAL SUBSCRIBER LINE (DSL) POWER CONTROL

(75) Inventors: Raphael Jean Cendrillon, Hong Kong (CN); Dong Wei, Austin, TX (US)

(73) Assignee: Futurewei Technologies, Inc., Plano, TX (US)

( * ) Notice: Subject to any disclaimer, the term of this patent is extended or adjusted under 35 U.S.C. 154(b) by 1113 days.

(21) Appl. No.: 12/637,872

(22) Filed: Dec. 15, 2009

(65) Prior Publication Data

US 2010/0195704 A1   Aug. 5, 2010

Related U.S. Application Data

(60) Provisional application No. 61/148,823, filed on Jan. 30, 2009.

(51) Int. Cl.
*H04B 1/38* (2006.01)
*H04L 5/16* (2006.01)

(52) U.S. Cl.
USPC ............ 375/222; 375/220; 375/260; 375/346

(58) Field of Classification Search
USPC .................................. 375/220, 222, 260, 346
See application file for complete search history.

(56) References Cited

U.S. PATENT DOCUMENTS

| 7,406,117 | B2 * | 7/2008 | Bella et al. | 375/219 |
| 7,835,429 | B1 * | 11/2010 | Cendrillon | 375/222 |
| 7,991,122 | B2 * | 8/2011 | Cioffi et al. | 379/1.04 |
| 2004/0264559 | A1 * | 12/2004 | Cendrillon et al. | 375/219 |

FOREIGN PATENT DOCUMENTS

EP   1670202 A1   6/2006

OTHER PUBLICATIONS

Yu, Wei, et al., "Distributed Multiuser Power Control for Digital Subscriber Lines," IEEE Journal on Selected Areas in Communications, vol. 20, No. 5, Jun. 2002, pp. 1105-1115.
"Pre-published American National Standard for Telecommunications—Dynamic Spectrum Management," ATIS Standard ATIS-PP-0600007, 2007.
"Series G: Transmission Systems and Media, Digital Systems and Networks—Digital Sections and Digital Line System—Access Networks—Asymmetric Digital Subscriber Line (ADSL) Transceivers—Extended Bandwidth ADSL2 (ADSL2plus)," ITU-T G.992.5, (Jan. 2009).
"Series G: Transmission Systems and Media, Digital Systems and Networks—Digital Sections and Digital Line System—Access Networks—Very High Speed Digital Subscriber Line Transceivers," ITU-T G.993.2, (Feb. 2006).

* cited by examiner

*Primary Examiner* — Qutbuddin Ghulamali
(74) *Attorney, Agent, or Firm* — Conley Rose, P.C.; Grant Rodolph; Rayhao Chung (57) ABSTRACT

An apparatus comprising a transmitter at a digital subscriber line (DSL) Cabinet configured to transmit a downstream signal in a subscriber line according to a power spectral density (PSD) mask, wherein the PSD mask comprises a relatively low power between a first transition frequency and a second transition frequency and a first relatively high power below about the first transition frequency and a second relatively high power above about the second transition frequency. Also included is an apparatus comprising at least one processor configured to implement a method comprising selecting a first transmission frequency and a second transmission frequency for a PSD that meets a target data-rate for transmission in a DSL, and limiting the PSD between the first transition frequency and the second transition frequency.

20 Claims, 5 Drawing Sheets

LOW COMPLEXITY TECHNIQUE FOR DIGITAL SUBSCRIBER LINE (DSL) POWER CONTROL

CROSS-REFERENCE TO RELATED APPLICATIONS

The present application claims priority to U.S. Provisional Patent Application No. 61/148,823 filed Jan. 30, 2009 by Raphael Jean Cendrillon, et al. and entitled, "Method for Reducing the Feedback Overhead During Crosstalk Precoder Initialization," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital subscriber line (DSL) technologies can provide relatively large bandwidth for digital communications over existing subscriber lines. When transmitting data over the subscriber lines, crosstalk interference can occur between the transmitted signals over adjacent twisted-pair phone lines, for example in a same or nearby bundle of lines. Crosstalk limits the performance of some DSL technologies, such as asymmetric DSL 2 (ADSL2) and very high bit rate DSL 2 (VDSL2). Crosstalk can occur in mixed deployment scenarios, where cabinet and exchange deployed lines operate within relatively short proximity or in the same binder. Downstream power back-off (DPBO) is a static spectrum management technique that is used to reduce crosstalk. However, DPBO is typically configured to reduce crosstalk and meet a single data-rate requirement. Since the signals are typically transmitted at different rates in the lines, the DPBO does not ensure service requirements, e.g. data-rate or quality of service (QoS) requirements, for each line. Alternatively, dynamic spectrum management (DSM) techniques may be used to reduce crosstalk and achieve service requirements in multiple lines. The DSM techniques are based, on algorithms that optimize the power spectrum density (PSD) of the transmitter (e.g. modem), such as iterative waterfilling, iterative spectrum balancing, and optimal spectrum balancing. Disadvantages of such algorithms include poor performance (e.g. using iterative waterfilling) or relatively high computational complexity (e.g. using iterative spectrum balancing or optimal spectrum balancing), which causes implementation difficulties.

SUMMARY

In one embodiment, the disclosure includes an apparatus comprising a transmitter at a DSL Cabinet configured to transmit a downstream signal in a subscriber line according to a PSD mask, wherein the PSD mask comprises a relatively low power between a first transition frequency and a second transition frequency and a first relatively high power below about the first transition frequency and a second relatively high power above about the second transition frequency.

In another embodiment, the disclosure includes an apparatus comprising at least one processor configured to implement a method comprising selecting a first transmission frequency and a second transmission frequency for a PSD that meets a target data-rate for transmission in a DSL, and limiting the PSD between the first transition frequency and the second transition frequency.

In yet another embodiment, the disclosure includes a method comprising selecting at least a first transition frequency and a second transition frequency for a plurality of PSDs for a plurality of Cabinet deployed lines, and transmitting a plurality of tones that have a substantially low power between the first transition frequency and second transition frequency in the Cabinet deployed lines.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for reducing crosstalk in a bundle of subscriber lines in DSL systems, such as ASDL2 and VDSL2 based networks. The subscriber lines may be deployed by an exchange server at a central office (CO) and a cabinet positioned between the CO and customer premises. The method comprises an algorithm that may reduce the crosstalk between the lines and ensure service requirements by meeting the required data-rates in the cabinet deployed lines. The DSM algorithm may comprise selecting two transition frequencies for configuring the transmitted PSD for each line, for instance on a line by line basis. The two transition frequencies may be selected according to the required data-rate in the line(s) and may reduce the crosstalk in the line(s). The DSM algorithm may have less computational complexity than conventional DSM algorithms (e.g. iterative waterfilling, iterative spectrum balancing, and optimal spectrum balancing) and may be simpler to implement. The DSM algorithm may also have higher performance than some DSM algorithms.

Figure 1:
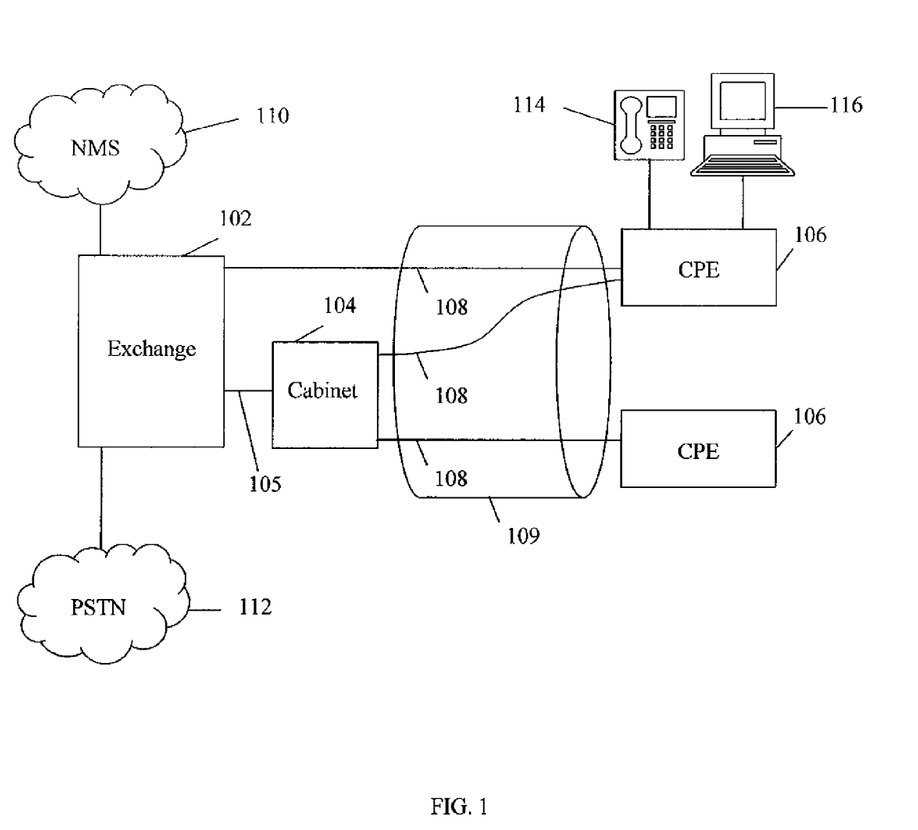
FIG. 1 is a schematic diagram of an embodiment of a DSL system.

FIG. 1 illustrates one embodiment of a DSL system 100. The DSL system 100 may be a VDSL2 system, an ADSL2 system, an ADSL2 plus (ADSL2+) system, or any other DSL system. The DSL system 100 may comprise an Exchange 102, a Cabinet 104 coupled to the Exchange 102 by a cable 105, and a plurality of customer premise equipments (CPEs)

106, which may be coupled to the Exchange 102 and/or the Cabinet 104 via a plurality of subscriber lines 108. At least some of the subscriber lines 108 may be bundled in a binder 109. Additionally, the DSL system 100 may optionally comprise a network management system (NMS) 110 and a public switched telephone network (PSTN) 112, both of which may be coupled to the Exchange 102. In other embodiments, the DSL system 100 may be modified to include splitters, filters, management entities, and various other hardware, software, and functionality.

The NMS 110 may be a network management infrastructure that processes data exchanged with the Exchange 102 and may be coupled to one or more broadband networks, such as the Internet. The PSTN 112 may be a network that generates, processes, and receives voice or other voice-band signals. In an embodiment, the Exchange 102 may be a server located at a central office and may comprise switches and/or splitters, which may couple the NMS 110, the PSTN 112, and the subscriber lines 108. For instance, the splitter may be a 2:1 coupler that forwards data signals received from the subscriber lines 108 to the NMS 110 and the PSTN 112, and forwards data signals received from the NMS 110 and the PSTN 112 to the subscriber lines 108. Further, the splitter may optionally comprise one or more filters to help direct data signals between the NMS 110, the PSTN 112, and the subscriber line 108. Additionally, the Exchange 102 may comprise at least one DSL transmitter/receiver (transceiver), which may exchange signals between the NMS 110, the PSTN 112, and the subscriber lines 108. The signals may be received and transmitted using the DSL transceiver, such as a modem. In an embodiment, the DSL transceiver may comprise a forward error correction (FEC) codeword generator that generates FEC data, an interleaver that interleaves the transmitted data across a plurality of tones, or both. For instance, the DSL transceiver may use a discrete multi-tone (DMT) line code that allocates a plurality of bits for each sub-carrier or tone in each symbol. The DMT may be adjusted to various channel conditions that may occur at each end of a subscriber line. In an embodiment, the DSL transceiver of the Exchange 102 may be configured to transmit data at similar or different rates for each subscriber line 108.

In an embodiment, the Cabinet 104 may be located at a distribution center between the CO and customer premises and may comprise switches and/or splitters, which may couple the Exchange 102 to the CPEs 106. For instance, the Cabinet 104 may comprise a DSL access multiplexer (DSLAM) that couples the Exchange 102 to the CPEs 106. Additionally, the Cabinet 104 may comprise a DSL transceiver, which may be used to exchange signals between the Exchange 102 and the CPEs 106. The DSL transceiver may process the received signals or may simply pass the received signals between the CPEs 106 and the Exchange 102. The splitter in the Cabinet 104 may be a N:1 coupler (where N is an integer) that routes data signals received from the Exchange 102 to N CPEs 106, and routes data signals received from the N CPEs 106 to the Exchange 102. The data signals may be transmitted and received using the DSL transceiver, which may be a modem. Further, the splitter of the Cabinet 104 may optionally comprise one or more filters to help direct data signals between the Exchange 102 and the CPEs 106 via the corresponding subscriber lines 108. In an embodiment, the DSL transceiver may be configured to transmit data to the CPEs 106 at similar or different rates and/or power for each subscriber line 108, as described in detail below.

In an embodiment, the CPEs 106 may be located at the customer premises, where at least some of the CPEs 106 may be coupled to a telephone 114 and/or a computer 116. The telephone 114 may be hardware, software, firmware, or combinations thereof that generates, processes, and receives voice or other voice-band signals. The CPE 106 may comprise a switch and/or a splitter, which may couple the subscriber lines 108 and the telephone 114 and the computer 116. The CPE 106 may also comprise a DSL transceiver to exchange data between the CPE 106 and the Exchange 102 via the subscriber line 108. For instance, the splitter may be a 2:1 coupler that forwards data signals received from the subscriber line 108 to the telephone 114 and the DSL transceiver, and forwards data signals received from the telephone 114 and the DSL transceiver to the subscriber line 108. The splitter may optionally comprise one or more filters to help direct data signals to and from the telephone 114 and the DSL transceiver. The DSL transceiver, e.g. a modem, may transmit and receive signals through the subscriber lines 108. For instance, the DSL transceiver may process the received signals to obtain the transmitted data from the Exchange 102, and pass the received data to the telephone 114, the computer 116, or both. The CPEs 106 may be coupled to the Exchange 102 directly via the subscriber lines 108 and/or via the subscriber lines 108 and the Cabinet 104. For example any of the CPEs 106 may be coupled to a subscriber line 108 from the Exchange 102 and/or a subscriber line 108 from the Cabinet 104. The CPEs 106 may access the NMS 110, the PSTN 112, and/or other coupled networks via the subscriber lines 108 deployed by the Exchange 102 and/or the Cabinet 104.

In an embodiment, the subscriber lines 108 may be telecommunications paths between the Exchange 102 and the CPE 106 and/or between the Cabinet 104 and the CPEs 106, and may comprise one or more twisted-pairs of copper cable. Crosstalk interference may occur between the tones or signals transported through the subscriber lines 108 that are deployed by the Exchange 102 and the Cabinet 104, e.g. in the binder 109. The crosstalk interference may be related to the power, frequency, and travel distance of the transmitted signals and may limit the communications performance in the network. For instance, when the PSD of the transmitted signals increase, e.g. over a range of frequencies, the crosstalk between the adjacent subscriber lines 108 may increase and hence the data-rates may decrease. To reduce or limit the crosstalk in the lines, the DSL transceiver of the Cabinet 104 may be configured to control and adjust the PSD of the signals or tones transmitted downstream, e.g. to the CPEs 106, in any of the subscriber lines 108. The DSL transceiver may be used to reduce the PSD of a transmitted signal in a line to ensure a sufficient data-rate that meets service requirements. The PSD may be controlled, e.g. using software, hardware, firmware, or combinations thereof, according to a PSD profile or mask to reduce crosstalk. The PSD mask may be optimized to meet the service requirements for any of the lines, such as the data-rate in the line.

Figure 2:
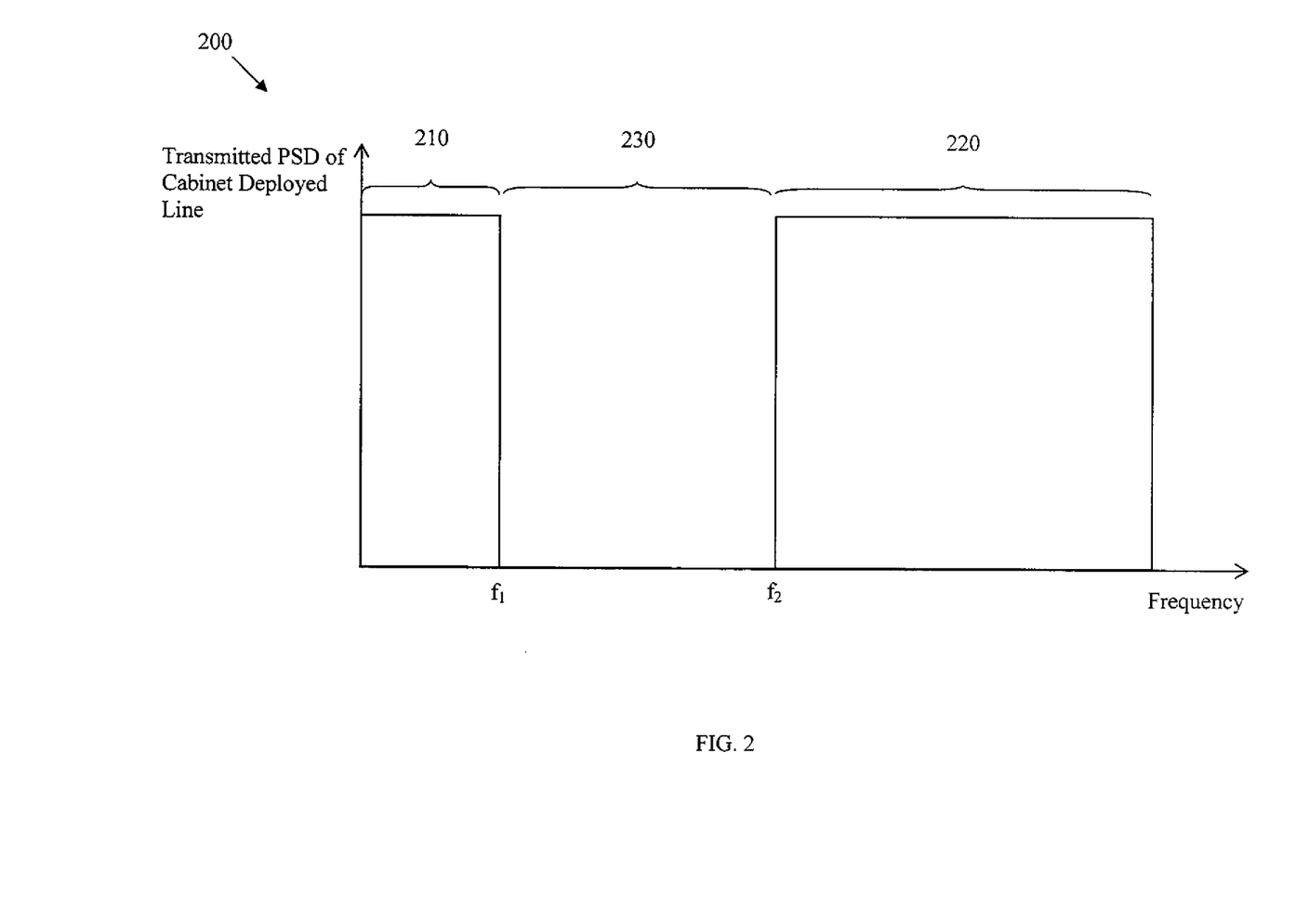
FIG. 2 is a chart of an embodiment of a PSD mask.

FIG. 2 illustrates an embodiment of a PSD mask 200, which may correspond to a configured power vs. frequency profile for a transmitted signal in a subscriber line. The PSD mask 200 may comprise a first increased PSD portion 210, a second increased PSD portion 220, and a decreased PSD portion 230 between the first increase PSD portion 210 and the second increased PSD portion 220. The first increased PSD portion 210 may correspond to frequencies less than or equal to about a first transition frequency ($f_1$), where the transmitted PSD of Cabinet deployed line may remain substantially constant across the frequency range. Although crosstalk in the lines typically increases as the frequency of transmitted signals increases, the crosstalk between the lines deployed by the Exchange and the Cabinet is relatively low at low frequencies, such as below $f_1$. Thus, the Cabinet deployed lines may be allowed to transmit signals in the range below or equal to about $f_1$ without causing substantial crosstalk between the Exchange and the Cabinet deployed lines. For example, the transmitted PSD of the first increased PSD portion 210 may be equal to about the full power of the transmitter at the Cabinet.

Additionally, the second increased PSD portion 220 may correspond to frequencies greater than or equal to about a second transition frequency ($f_2$), where the transmitted PSD of the Cabinet deployed line may remain substantially constant across the frequency range. Above $f_2$, the frequencies may be substantially high and may not be suitable for transmissions over relatively long distances from the Exchange to the CPEs due to dispersion effects. Consequently, such frequency channels may be dedicated to the lines from the Cabinet to the relatively close CPEs, which may allow for higher PSDs. For instance, the transmitted PSD of the second increased PSD portion may be equal to about the transmitted PSD of the first increased PSD portion 210, e.g. at about the full power of the transmitter at the Cabinet.

However, the transmitted PSD of Cabinet deployed line in the decreased PSD portion 230 (e.g. at frequencies between about $f_1$ and about $f_2$) may be substantially smaller than the values in the first increased PSD portion 210 (e.g. at frequencies less than or equal to about $f_1$) and the second increased PSD portion 220 (e.g. at frequencies greater than or equal to about $f_2$). For example, the transmitted PSD in the decreased PSD portion 230 may be less than about 20 percent, about ten percent, about five percent, about two percent, or about one percent of the maximum transmission power. In some embodiments, the transmitted PSD in the decreased PSD portion 230 may be equal to about zero, where no substantial power may be used to transmit signals from the Cabinet deployed lines in the range between about $f_1$ and about $f_2$. The crosstalk between the Exchange and Cabinet deployed lines in the range between the two transition frequencies $f_1$ and $f_2$ generally increases as the frequencies increase. Consequently, decreasing PSD transmissions in the PSD portion 230 between about $f_t$ and about $f_2$ may reduce the crosstalk between the lines. Thus, the frequency channels in this range may be dedicated to transmissions from the Exchange to the CPEs without substantial transmissions from the Cabinet. Alternatively, the decreased PSD portion 230 may be equal to a relatively low value (in comparison to the first increased PSD portion 210 and the second increased PSD 220), which may not cause substantial crosstalk between Exchange and Cabinet deployed lines.

In an embodiment, an algorithm may be used to select the first transition frequency $f_1$ and the second transition frequency $f_2$ for the transmitted PSD of a Cabinet deployed line, e.g. in the PSD mask 200. The transition frequencies may be selected to meet the target or required data-rate for the Cabinet deployed line and to reduce damage caused by crosstalk to an Exchange deployed line associated with the Cabinet deployed line, e.g. in the same binder or coupled to the same CPE. The transition frequencies may be selected to improve or maximize the data-rate in the Exchange deployed line while meeting the target data-rate of the Cabinet deployed line, which may be expressed mathematically as:

$$\max\{R_{exchange}\}, \text{ such that } R_{cab} \geq R_{cab}^{target}$$

$$s_1^{cab} \ldots s_k^{cab}$$

where max { } indicates a function for selecting a maximum sample from a set, $s_K^{cab}$ is the PSD of the cabinet deployed line for a tone (or signal) k, $R_{change}$ is the data-rate of the Exchange deployed line, $R_{cab}$ is a configured data-rate of the Cabinet deployed line, and $R_{cab}^{target}$ is the target data-rate of the Cabinet deployed line.

The algorithm may be implemented using software, hardware, firmware, or combinations thereof, and may comprise a plurality of parameters, including a minimum allowed transmission frequency $f_{min}$ and a maximum allowed transmission frequency $f_{max}$. For example, $f_{min}$ may be equal to about 138 Kilohertz (KHz) and $f_{max}$ may be equal to about 2.2 Megahertz (MHz) for ADSL2. To select the transition frequencies in the Cabinet deployed line, the algorithm may first configure the PSD mask for the Exchange deployed line associated with the Cabinet deployed line to a limit mask power level (e.g. maximum transmission power). The algorithm may then configure the PSD mask for the Cabinet deployed line by selecting two transition frequencies according to the required data-rate of the Cabinet deployed line. For instance, the algorithm may comprise the following instructions:

```
set PSD of exchange deployed line to limit mask
R*_exchange = -1
for f_1 = f_min ... f_max
    for f_2 = f_1 + 1 ... f_max
        set PSD of cabinet deployed line to limit mask on frequencies
        f_min ... f_1
        set PSD of cabinet deployed line to zero on frequencies
        f_1 + 1 ... f_2 - 1
        set PSD of cabinet deployed line to limit mask on frequencies
        f_2 ... f_max
        calculate data-rate of exchange and cabinet deployed lines
        if R_cab > R_cab^target and R_exchange > R*_exchange
            f_1* = f_1, f_2* = f_2
            R*_exchange = R_exchange
        end
    end
end.
```

In the algorithm above, $R^*_{exchange}$ is a variable exchange data-rate parameter that is adjusted to a maximum value, and $f_1^*$ and $f_2^*$ are variable transition frequency parameters that are adjusted to meet the target data-rate of the line. Using the instructions above, the PSD mask for the Cabinet deployed line may be configured to the limit mask in the range of frequencies to zero in the range of frequencies $f_1^*+1 \ldots f_2^*-1$, and to the limit mask in the range of frequencies $f_2^* \ldots f_{max}$. Alternatively, the PSD mask for the Cabinet deployed line may be configured to a value that is higher than zero in the range of frequencies $f_1^*+1 \ldots f_2^*-1$ and that may not cause substantial crosstalk between the Exchange and Cabinet deployed lines at that frequency range.

In some embodiments, a constraint may be imposed on the total transmission power of the line, e.g. due to limitation on the analog circuitry of the transmitter in Cabinet and Exchange. For instance, a waterfilling algorithm may be used in the algorithm above to enforce a limit on the total transmission power. As such, the algorithm for configuring the PSD masks above may be adjusted, such as:

```
set PSD of cabinet deployed line to zero
set PSD mask of exchange deployed line to limit mask
run waterfilling under PSD mask to enforce power constraint on exchange
    deployed line
R*_exchange = -1
```

-continued

```
for f₁ = f_min ... f_max
    for f₂ = f₁ + 1 ... f_max
        set PSD mask of cabinet deployed line to limit mask on frequencies
            f_min ... f₁
        set PSD mask of cabinet deployed line to zero on frequencies
            f₁ + 1 ... f₂ - 1
        set PSD mask of cabinet deployed line to limit mask on frequencies
            f₂ ... f_max
        run waterfilling under PSD mask to enforce power constraint on
            cabinet deployed line
            frequencies f₂ ... f_max
        calculate data-rate of exchange and cabinet deployed lines
        if R_cab > R_cab^target and R_exchange > R*_exchange
            f₁* = f₁, f₂* = f₂
            R*_exchange = R_exchange
        end
    end
end.
```

In the case of a plurality of Exchange deployed lines and Cabinet deployed lines in the network, the two transition may be optimally selected for each Cabinet deployed line to meet the corresponding required data-rate and to reduce damage caused by crosstalk to the Exchange deployed lines. The transition frequencies may be selected to maximize the data-rates in the Exchange deployed lines while meeting the target data-rates of the Cabinet deployed lines, which may be expressed mathematically as:

$$\max_{s_1^1 \ldots s_K^1, \ldots, s_1^{N_{cab}} \ldots s_K^{N_{cab}}} \{J\}, \text{ such that } R_{cab}^n \geq R_{cab}^{n,target}, \forall n = 1 \ldots N_{cab}$$

$$\text{where } J = \sum_{n=1}^{N_{exchange}} \frac{R_{exchange}^n}{\alpha_n}.$$

In the equation above, n is an index that indicates the Cabinet deployed line, $s_K^n$ is the PSD of the n-th cabinet deployed line for a tone k, $N_{exchange}$ is the quantity of the Exchange deployed lines, $N_{cab}$ is the quantity of the Cabinet deployed lines, $R_{exchange}^n$ is the data-rate of the n-th Exchange deployed line, $R_{cab}^n$ is a configured data-rate of the n-th Cabinet deployed line, and $R_{cab}^{n,target}$ is the target data-rate of the n-th Cabinet deployed line. The parameter $\alpha_n$ is a scaling factor that may be used to ensure an appropriate rate allocation for the Cabinet deployed lines that is fair. For example, $\alpha_n$ may be equal to about $R_{exchange}^{n,max}$, which is the data-rate that may be achieved for the exchange n-th Exchange deployed line in the absence of crosstalk. Alternatively, the scaling factor $\alpha_n$ may be selected according to other criteria.

In an embodiment, an algorithm may be used to select the same first transition frequency $f_1$ and the second transition frequency $f_2$ for the PSDs of the Cabinet deployed lines. As such, the algorithm may be relatively simple to implement and may have higher performance, e.g. in comparison to conventional DSM algorithms. The algorithm may comprise the following instructions:

```
set PSD of cabinet deployed lines to zero
set PSD mask of exchange deployed lines to limit mask
run iterative waterfilling under PSD mask to enforce power constraint on
    exchange deployed lines
J* = -1
for f₁ = f_min ... f_max
    for f₂ = f₁ + 1 ... f_max
```

-continued

```
        set PSD mask of cabinet deployed lines to limit mask on frequencies
            f_min ... f₁
        set PSD mask of cabinet deployed lines to zero on frequencies
            f₁ + 1 ... f₂ - 1
        set PSD mask of cabinet deployed lines to limit mask on frequencies
            f₂ ... f_max
        run iterative waterfilling under PSD mask to enforce power constraint
            on cabinet
            deployed lines
            frequencies f₂ ... f_max
        calculate data-rate of exchange and cabinet deployed lines
        if R_cab^n ≥ R_cab^{n,target}, ∀n = 1...N_cab and J* > J
            f₁* = f₁, f₂* = f₂
            J* = J
        end
    end
end.
```

In the algorithm above, is a variable exchange data-rate parameter that is adjusted to a maximum value. According to the algorithm above, when the variable transition frequency parameters $f_1^*$ and $f_2^*$ are adjusted to meet the target data-rates, the PSDs for the Cabinet deployed lines may be configured using iterative waterfilling to impose power constraints. Although waterfilling and iterative waterfilling techniques are used in the algorithms above to enforce power constraints, other techniques may be used instead, e.g. to deactivate the highest frequency tones until the power constraint is satisfied.

In the algorithm above, the transition frequencies may be selected for each line in the Cabinet deployed lines on a line by line basis in an iterative manner. The selected transition frequencies (e.g. $f_1$ and $f_2$) may be the same or different for different lines. Selecting the transition frequencies on a line by line basis may simplify the complexity of the algorithm, and hence facilitate practical implementation of the algorithm. For example, the algorithm above may be less complex than some DSM techniques, which may use dual decomposition and optimization of Lagrangian coefficients. Further, configuring the PSD of a Cabinet deployed line by selecting two transition frequencies that meet the required data-rate to reduce crosstalk may improve performance in comparison to other DSM techniques, such as iterative waterfilling.

Figure 3:
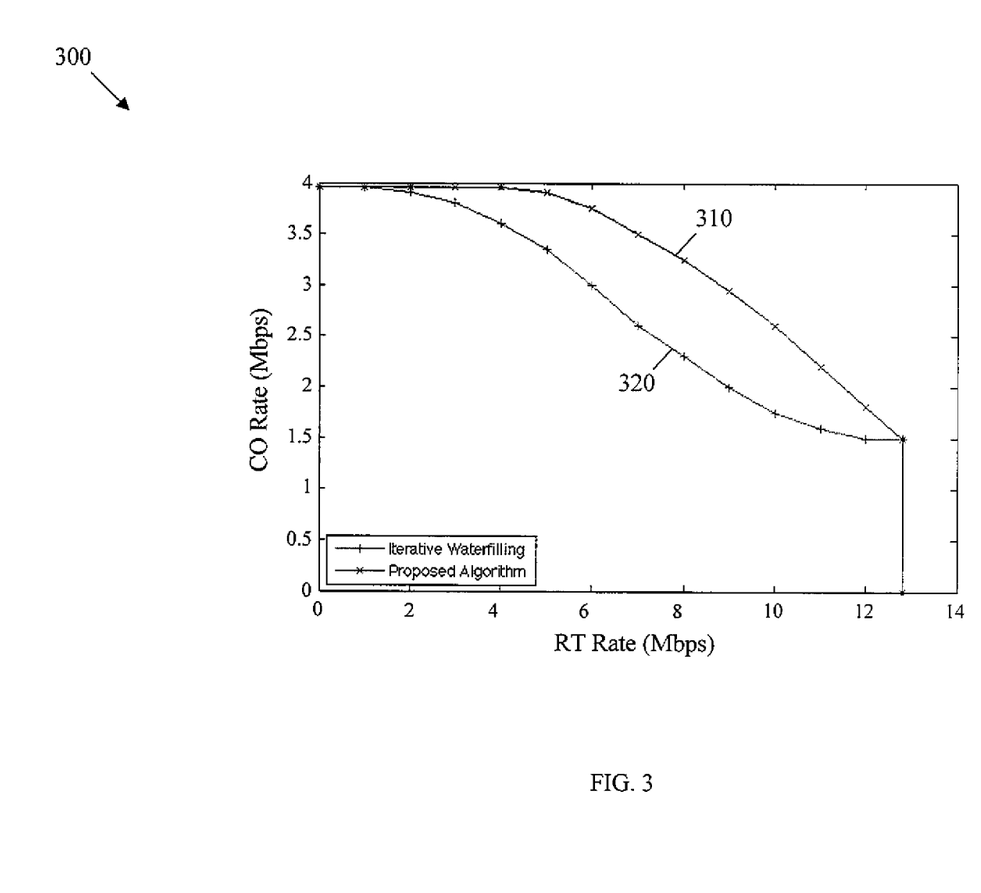
FIG. 3 is a chart of an embodiment of an Exchange/Cabinet rate configuration.

FIG. 3 illustrates an embodiment of an Exchange/Cabinet rate configuration 300 for a plurality of rates, e.g. between a plurality of Exchange and Cabinet deployed lines. The Exchange/Cabinet rate configuration 300 is represented by a curve 310 that comprises a plurality of points. The points correspond to Exchange rate (CO Rate) and Cabinet rate (RT Rate) pairs in the lines, where the PSDs have been configured. The points correspond to about 14 Exchange/Cabinet rate pairs. Specifically, the PSDs of the Cabinet lines were configured using the algorithm above by selecting the transition frequencies for the PSDs that meet the target data-rates of the Cabinet deployed lines. The same two transition frequencies were selected for the Cabinet deployed lines. Additionally, the PSDs of the Exchange deployed lines may be maintained at a limit mask power level (e.g. maximum transmission power).

The points in the curve 310 correspond to a compromise between Exchange rates and Cabinet rates to limit crosstalk in the lines. Accordingly, when the frequency channels in the Exchange deployed lines and hence the Exchange rates are increased, the frequency channels in the Cabinet deployed lines and hence the Cabinet rates are decreased to reduce the crosstalk. For example, when the Exchange rate in an Exchange deployed line for a CPE is relatively low, e.g. equal to about 1.5 Megabits per second (Mbps), the Cabinet rate in a Cabinet deployed line for the CPE may be relatively high, e.g. equal to about 13 Mbps. In comparison, when the Exchange rate for a second CPE is higher, e.g. equal to about 3.5 Mbps, the Cabinet rate for the second CPE may be lower, e.g. equal to about seven Mbps.

The curve 310 may be compared to a curve 320 that represents Exchange/Cabinet rate pairs configured using the iterative waterfilling algorithm to meet the target data-rates of the Cabinet deployed lines. The curve 320 indicates lower performance than the curve 310 in terms of achieved Exchange/Cabinet rate pairs. As shown in FIG. 3, higher Cabinet rates may be supported for the same Exchange rates based on the algorithm for configuring the PSDs using the transition frequencies in comparison to the iterative waterfilling algorithm. Therefore, using the two transition frequencies to configure the PSDs may be advantageous over the iterative waterfilling algorithm (or similar DSM techniques) in terms of both simplicity and performance.

Figure 4:
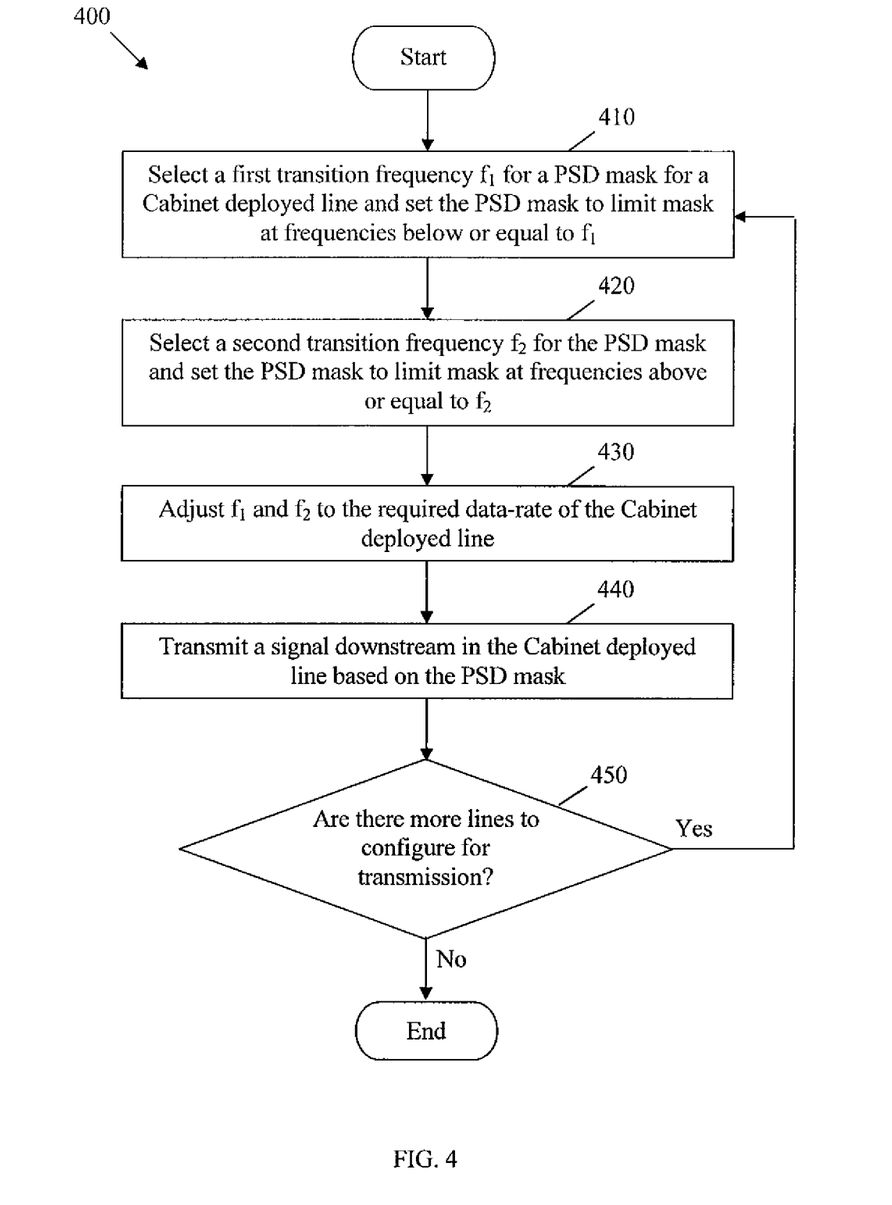
FIG. 4 s a flowchart of an embodiment of a PSD configuration method.

FIG. 4 illustrates an embodiment of a PSD configuration method 400, which may be used to configure a PSD mask in at least one Cabinet deployed line. The PSD masks may be configured based on two transition frequencies to reduce the crosstalk between the lines. The two transition frequencies may also configure the PSDs to meet the required data-rates in the lines. Configuring the PSDs using the transition frequencies to reduce crosstalk and meet the required data-rates in the lines may have higher performance and may be simpler to implement in comparison to other conventional DSM techniques.

The method 400 may begin at block 410, where a first transition frequency ($f_1$) may be selected for a PSD mask, and the PSD mask may be set to limit mask for a range of frequencies below or equal to $f_1$. For example, $f_1$ may be selected based on the distances between the Exchange, the Cabinet, and the CPE, such that the crosstalk between Exchange and Cabinet deployed lines may be relatively low at frequencies below $f_1$. Next, at block 420, a second transition frequency ($f_2$) may be selected for the PSD mask, and the PSD mask may be set to limit mask for a range of frequencies above or equal to $f_2$. For example, $f_2$ may be selected based on the distance between the Exchange and the CPE, such that the crosstalk between Exchange and Cabinet deployed lines may be relatively high at frequencies above $f_2$. In some embodiment, the PSD mask may be set to less than limit mask for the range of frequencies below $f_1$ and above $f_2$ due to power constraints in the system.

Next, at block 430, the first and second transition frequencies, $f_1$ and $f_2$, may be adjusted to meet the required data-rate of the Cabinet deployed line. Next, at block 440, the signal may be transmitted downstream in the Cabinet deployed line based on the PSD mask. At block 450, the method 400 may determine whether there are more Cabinet deployed lines to configure for transmission. If the condition in block 450 is met, the method 400 may return to block 410 to configure the PSD mask for another line based on the line's required data-rate and hence transmit the signal. Otherwise, the method 400 may end.

Figure 5:
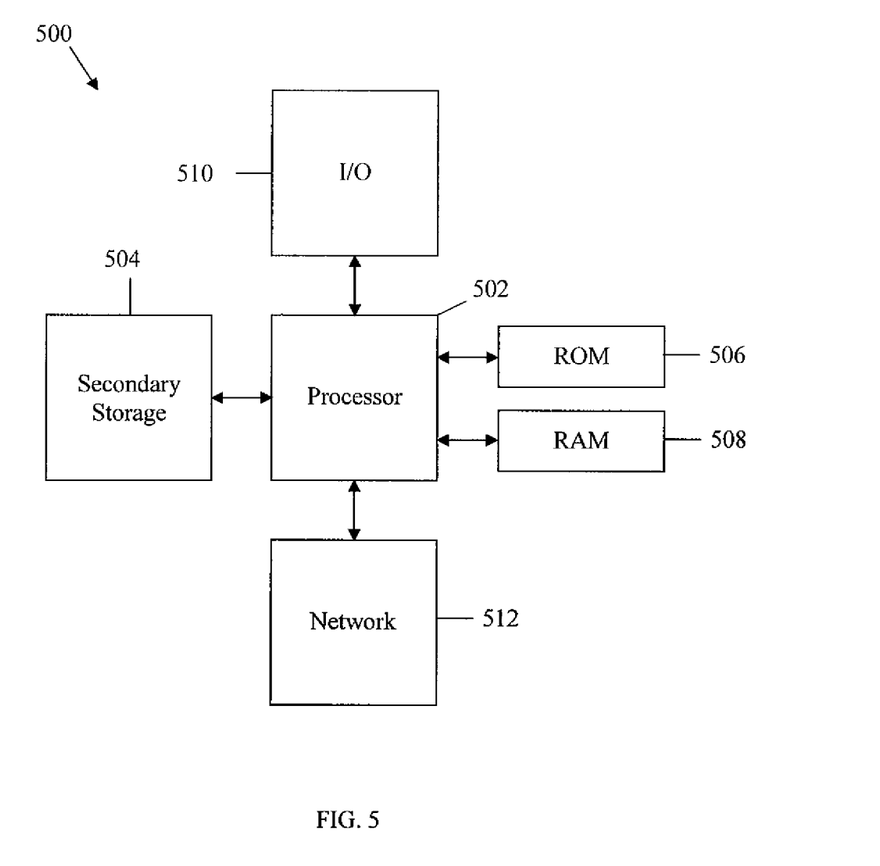
FIG. 5 is a schematic diagram of one embodiment of a general-purpose computer system.

The components described above may be operated in conjunction with any general-purpose network component, such as a computer or network component with sufficient processing power, memory resources, and network throughput capability to handle the necessary workload placed upon it. FIG. 5 illustrates a typical, general-purpose network component 500 suitable for implementing one or more embodiments of the components disclosed herein. The network component 500 may include a processor 502 (which may be referred to as a central processor unit or CPU) that is in communication with any memory devices including secondary storage 504, read only memory (ROM) 506, random access memory (RAM) 508, input/output (I/O) devices 510, and network connectivity devices 512, or combinations thereof. The processor 502 may be implemented as one or more CPU chips, or may be part of one or more application specific integrated circuits (ASICs).

The secondary storage 504 is typically comprised of one or more disk drives or tape drives and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a transmitter at a digital subscriber line (DSL) Cabinet configured to transmit a downstream signal in a subscriber line according to a power spectral density (PSD) mask,
   wherein the PSD mask comprises a relatively low power between a first transition frequency and a second transition frequency and a first relatively high power below the first transition frequency and a second relatively high power above the second transition frequency, and
   wherein the downstream signal is transmitted using a frequency range including frequencies below the first transition frequency and above the second transition frequency.

2. The apparatus of claim 1, wherein the relatively low power is zero.

3. The apparatus of claim 1, wherein the first relatively high power and the second relatively high power are equal to a maximum PSD.

4. The apparatus of claim 1, wherein the Cabinet is coupled to a customer premise equipment (CPE) via the subscriber line and to an Exchange, and wherein the Exchange is coupled to the CPE via a second subscriber line.

5. The apparatus of claim 4, wherein the relatively low power between the first transition frequency and second transition frequency does not cause substantial crosstalk between the subscriber line and the second subscriber line.

6. The apparatus of claim 4, wherein the subscriber line and the second subscriber line are bundled in a binder.

7. The apparatus of claim 6, wherein the binder further comprises a plurality of subscriber lines between the Cabinet and a plurality of CPEs, and a plurality of second subscriber lines between the Exchange and the CPEs.

8. The apparatus of claim 7, wherein the second subscriber lines are substantially longer than the subscriber lines.

9. The apparatus of claim 7, wherein the data rates of the subscriber lines decrease as the data rates for the second subscriber lines increase.

10. The apparatus of claim 1, wherein the downstream signal includes a first plurality of subcarriers below the first transition frequency and a second plurality of subcarriers above the second transition frequency, wherein the first plurality of subcarriers and the second plurality of subcarriers are transmitted at the first relatively high power.

11. An apparatus comprising:
    at least one processor configured to:
    select a first transmission frequency and a second transmission frequency for a power spectral density (PSD) that meets a target data-rate for transmission in a digital subscriber line (DSL); and
    limit the PSD between the first transition frequency and the second transition frequency to a relatively low power,
    wherein the PSD is substantially equal to a relatively high power below the first transmission frequency and above the second transmission frequency.

12. The apparatus of claim 11, wherein limiting the PSD between the first transition frequency and the second transition frequency reduces crosstalk.

13. The apparatus of claim 11 further comprising limiting the total power of the PSD using waterfilling.

14. The apparatus of claim 11 further comprising:
    selecting the first transition frequency and second transition frequency for a plurality of PSDs for transmission in a plurality of subscriber lines; and
    limiting the PSDs between the first transition frequency and the second transition frequency.

15. The apparatus of claim 14 further comprising limiting the total power of the PSDs using iterative waterfilling.

16. The apparatus of claim 14, wherein adjusting the PSDs using the selected first transition frequency and second transition frequency requires fewer computations than adjusting the PSDs using iterative waterfilling, iterative spectrum balancing, and optimal spectrum balancing or using techniques based on dual decomposition and optimization of Lagrangian coefficients.

17. The apparatus of claim 14, wherein adjusting the PSDs using the selected first transition frequency and second transition frequency has higher performance than adjusting the PSDs using iterative waterfilling, and wherein higher Cabinet rates per Exchange rates are achieved.

18. A method comprising:
    selecting at least a first transition frequency and a second transition frequency for a plurality of power spectral densities (PSDs) for a plurality of Cabinet deployed lines;
    transmitting a plurality of sub-carriers that have a substantially low power between the first transition frequency and second transition frequency in the Cabinet deployed lines; and
    transmitting the sub-carriers at substantially high power below the first transition frequency and above the second transition frequency in the Cabinet deployed lines.

19. The method of claim 18 further comprising adjusting the power levels of the PSDs of the Cabinet deployed lines on a line by line basis.

20. The method of claim 18, wherein the first transition frequency and second transition frequencies are selected to meet a plurality of target data-rates in the Cabinet deployed lines and maximize a sum of data rates of a plurality of Exchange deployed lines.

* * * * *